(12) United States Patent
Boothroyd et al.

(10) Patent No.: US 9,456,310 B2
(45) Date of Patent: *Sep. 27, 2016

(54) METHOD FOR DETECTING MOBILE DEVICE CHARGING POINTS

(71) Applicant: International Business Machines Corporation, Armonk, NY (US)

(72) Inventors: Richard Boothroyd, Cambridge (GB); Robert L. Kerr, Cambridge (GB); Michael P. Kirwan, Cambridge (GB); Kevin J. Sayer, Cambridge (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/714,588

(22) Filed: May 18, 2015

(65) Prior Publication Data
US 2016/0112844 A1   Apr. 21, 2016

Related U.S. Application Data

(63) Continuation of application No. 14/514,418, filed on Oct. 15, 2014.

(51) Int. Cl.
*H04W 4/02* (2009.01)
*H04W 52/02* (2009.01)
(Continued)

(52) U.S. Cl.
CPC ............ *H04W 4/027* (2013.01); *H02J 7/0052* (2013.01); *H04M 1/72572* (2013.01); *H04W 4/02* (2013.01); *H04W 52/0251* (2013.01); *H04W 52/0261* (2013.01); *H04W 52/0264* (2013.01); *H02J 2007/0096* (2013.01)

(58) Field of Classification Search
None
See application file for complete search history.

(56) References Cited

U.S. PATENT DOCUMENTS

| 7,570,015 | B2 | 8/2009 | Bansal et al. |
| 7,960,945 | B1 | 6/2011 | Onorato et al. |

(Continued)

FOREIGN PATENT DOCUMENTS

WO   2014046860 A1   3/2014

OTHER PUBLICATIONS

IBM Appendix P, list of IBM patents or patent applications treated as related, May 18, 2015, pp. 1-2.

(Continued)

*Primary Examiner* — Alejandro Rivero
(74) *Attorney, Agent, or Firm* — Steven F. McDaniel; James H. Mayfield (57) ABSTRACT

As disclosed herein a method, executed by a computer, for detecting charging points for mobile devices includes determining the current location of the mobile device, identifying a charging point proximate to the current location, determining the probable travel time to the identified charging point, and activating a power conservation mode if the probable travel time is greater than the remaining estimated battery life. The current location may be completely stationary or stationary relative to some sort of transportation. The method may determine the likelihood the mobile device will visit a charging point. The method may also identify a location as a potential charging point, and after multiple uses, the location may be confirmed as a charging point. Additionally, the method may remove inactive charging points from a list of charging points. A computer system, and computer program product corresponding to the method are also disclosed herein.

8 Claims, 7 Drawing Sheets

(51) Int. Cl.
  *H04M 1/725*  (2006.01)
  *H02J 7/00*  (2006.01)

(56) References Cited

U.S. PATENT DOCUMENTS

| | | | |
|---|---|---|---|
| 8,054,192 B2 | 11/2011 | Grigsby et al. | |
| 2006/0135217 A1 | 6/2006 | Sung et al. | |
| 2012/0324259 A1* | 12/2012 | Aasheim | G06F 1/3206 713/320 |
| 2013/0162430 A1* | 6/2013 | Scherzer | G08B 21/24 340/539.13 |
| 2013/0191662 A1* | 7/2013 | Ingrassia, Jr. | G06F 1/3206 713/320 |
| 2013/0339072 A1* | 12/2013 | Touge | G06Q 10/00 705/5 |
| 2014/0155100 A1 | 6/2014 | Baldasare et al. | |
| 2015/0012510 A1* | 1/2015 | van der Laan | G08G 1/0112 707/702 |

OTHER PUBLICATIONS

"Introducing Google Now", <http://www.google.com/landing/now/#whatisit>, pp. 1-3. Aug. 28, 2014.
"Battery Re-charge Scheduling Notifications for Mobile Devices", An IP.com Prior Art Database Technical Disclosure, IP.com No. IPCOM000210032D, Publication Aug. 22, 2011, pp. 1-3, <http://ip.com/IPCOM/000210032>.
Boothroyd et al., "Method for Detecting Mobile Device Charging Points", U.S. Appl. No. 14/514,418, filed on Oct. 15, 2014, pp. 1-32.

* cited by examiner

METHOD FOR DETECTING MOBILE DEVICE CHARGING POINTS

BACKGROUND OF THE INVENTION

The present invention relates generally to the field of mobile devices, and more particularly to mobile device battery usage and conservation methods.

Mobile electronic devices (e.g., smart phones, tablets, pdas, and the like), also known as smart devices, are an integral part of the everyday life of many individuals. Society has become increasingly dependent on mobile devices for various aspects of day-to-day activities. These devices are only useful if the battery is charged, and when a device runs out of battery charge, it can be very disruptive to the user. Current technology relies on the user to monitor the battery charge remaining, and determine where and when they will be in a location that will accommodate charging of the mobile device.

SUMMARY

As disclosed herein a method, executed by a computer, for detecting charging points for mobile devices includes determining the current location of the mobile device, identifying a charging point proximate to the current location, determining the probable travel time to the identified charging point, and activating a power conservation mode if the probable travel time is greater than the remaining estimated battery life. The current location may be completely stationary or stationary relative to some sort of transportation. The method may determine the likelihood the mobile device will visit a charging point. The method may also identify a location as a potential charging point, and after multiple uses, the location may be confirmed as a charging point. Additionally, the method may remove inactive charging points from a list of charging points. A computer system, and computer program product corresponding to the method are also disclosed herein.

DETAILED DESCRIPTION

In a society that is becoming increasingly dependent on various mobile devices for managing daily activities, it can be very disruptive to a user when a battery-powered mobile device runs out of charge. Individuals are often habitual with regard to the time and location in which they charge their devices. For example, some may charge their device overnight by their bedside, others may charge the device during lunch at their place of employment, while commuters may prefer to charge as they drive. There is a need for a mobile device to have the ability to detect and maintain a list of charging points, monitor the current location of the mobile device, determine the travel time to a probable charging point, and if necessary, enter a power conservation mode to preserve battery power. The embodiments disclosed herein provide a method that both detects charging points and conserves battery power while in transit to a charging point.

Figure 1:
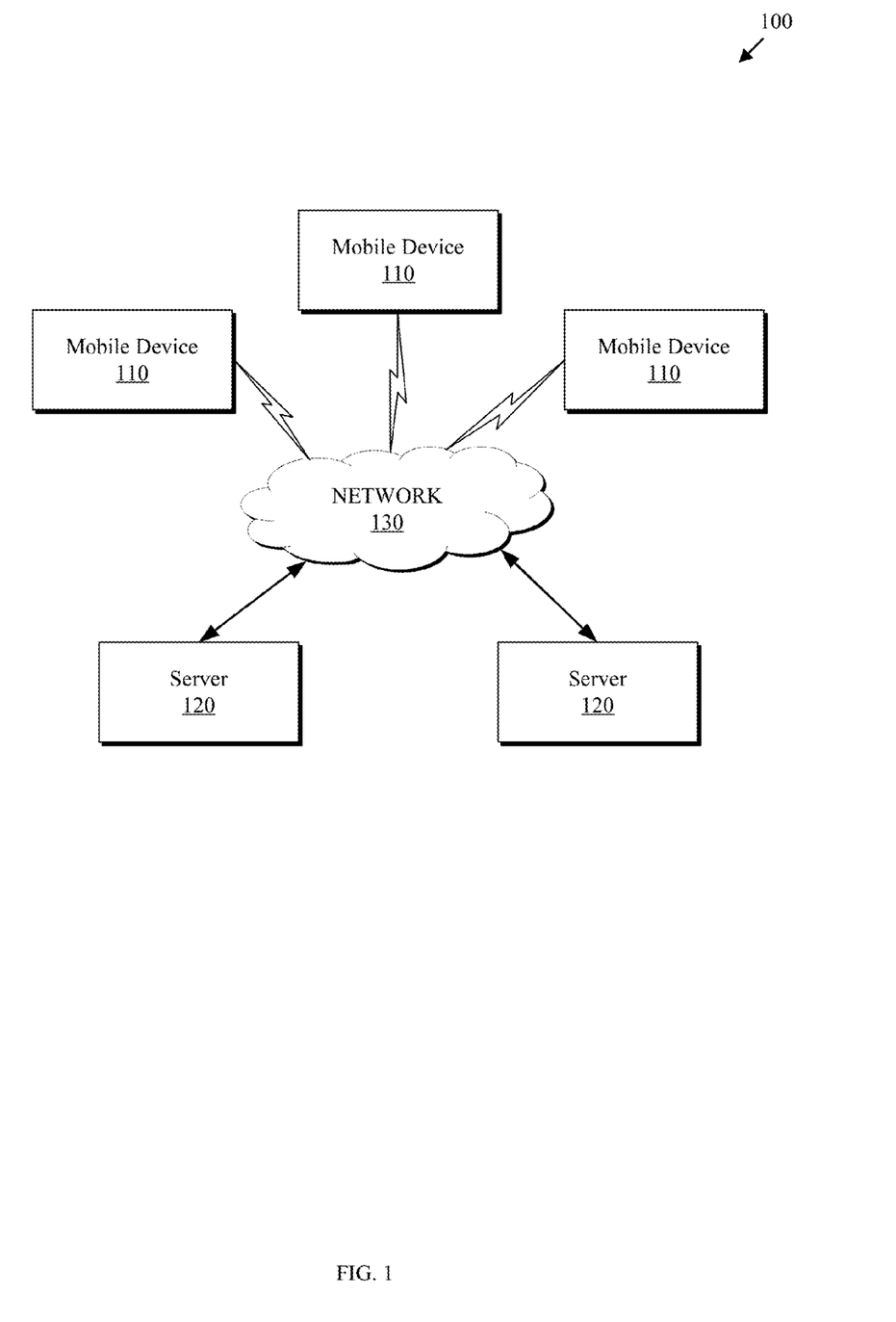
FIG. 1 is a functional block diagram of one embodiment of a wireless mobile device environment in which at least some of the embodiments disclosed herein may be deployed.

FIG. 1 is a functional block diagram of one embodiment of a mobile device environment 100. As depicted, the mobile device environment 100 includes one or more mobile devices 110, one or more servers 120, and a network 130. The mobile device environment 100 is one example of an environment in which at least some of the embodiments disclosed herein may be deployed.

A mobile device 110 may be a handheld electronic device often referred to as a smart device (e.g., smartphone, tablet, GPS, PDA, laptop, or the like). In one example, a mobile device 110, such as a tablet, may be used to video conference with a group of colleagues when holding a remote business meeting. In another example, a user on a family vacation is attempting to travel to a point of interest, and is using a GPS to guide them to the destination. An additional example includes a user monitoring their email and instant messaging with an acquaintance using a smartphone.

The mobile device 110 may connect to a server 120 to provide a service to the user of the mobile device 110. The server 120 may be accessible to the mobile device 110 via the network 130. In one embodiment, the mobile device 110 connects to the network 130 using a wireless connection provided by a mobile service provider (e.g., AT&T, Verizon, Sprint, or the like). Alternatively, the mobile device 110 may connect to the network 130 using an available wireless internet connection, such as those provided in many Wi-Fi hot spots, or available in many eating establishments or places of employment. The server 120 may provide various services to a mobile device 110 (i.e., cloud services, email services, instant messaging services, http services, music streaming, and video streaming, among many others).

Figure 7:
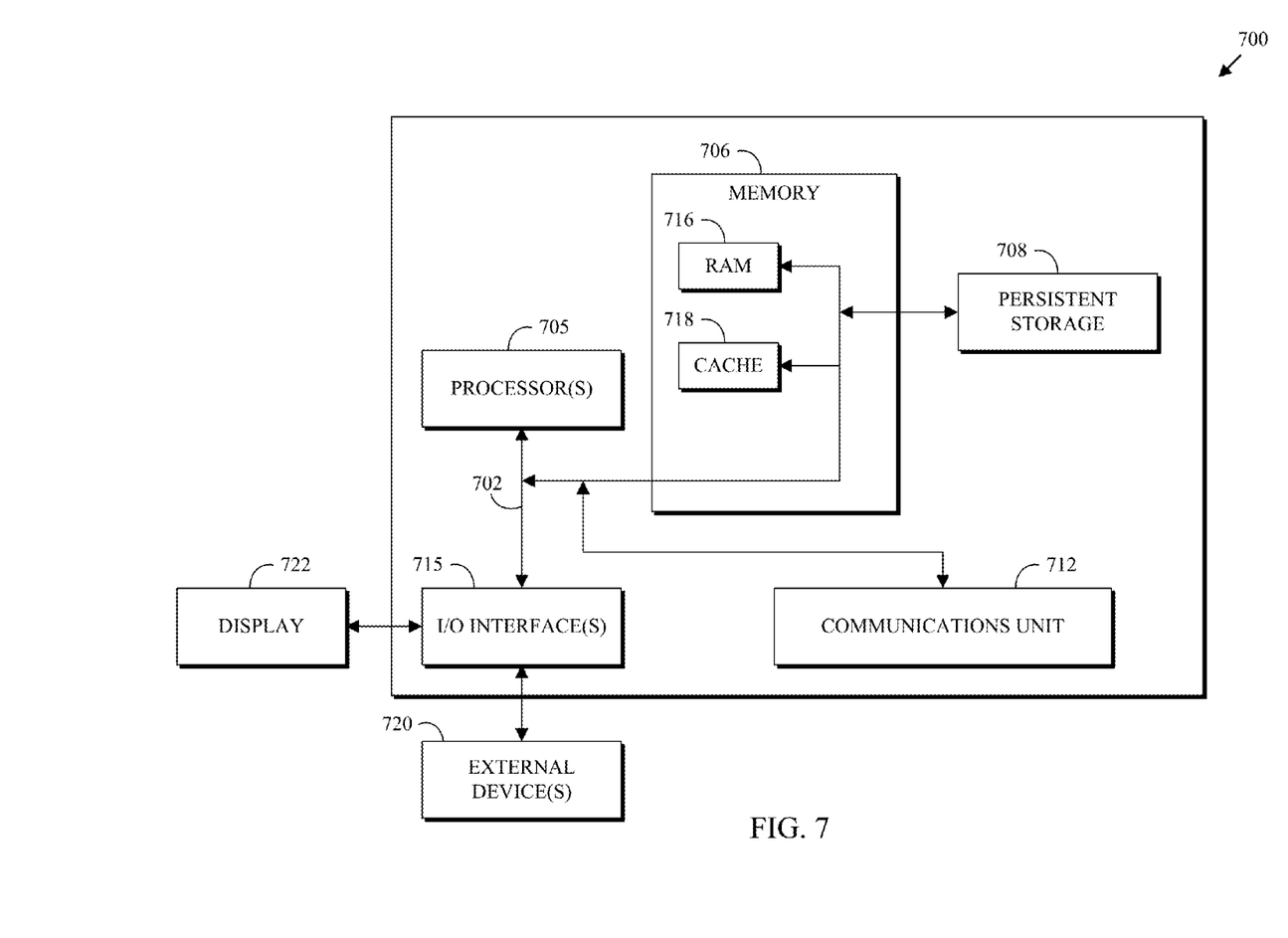
FIG. 7 is a block diagram depicting various components of one embodiment of a computer suitable for executing the methods disclosed herein.

It should be noted that the server 120 may include internal and external hardware components, as depicted and described in further detail with respect to FIG. 7. Furthermore, the network 130 can be any combination of connections and protocols that will support communications between the mobile clients 110 and the servers 120. For example, the network 130 can be a local area network (LAN), a wide area network (WAN) such as the Internet, or a combination of the two, and can include wired, wireless, or fiber optic connections.

Figure 2:
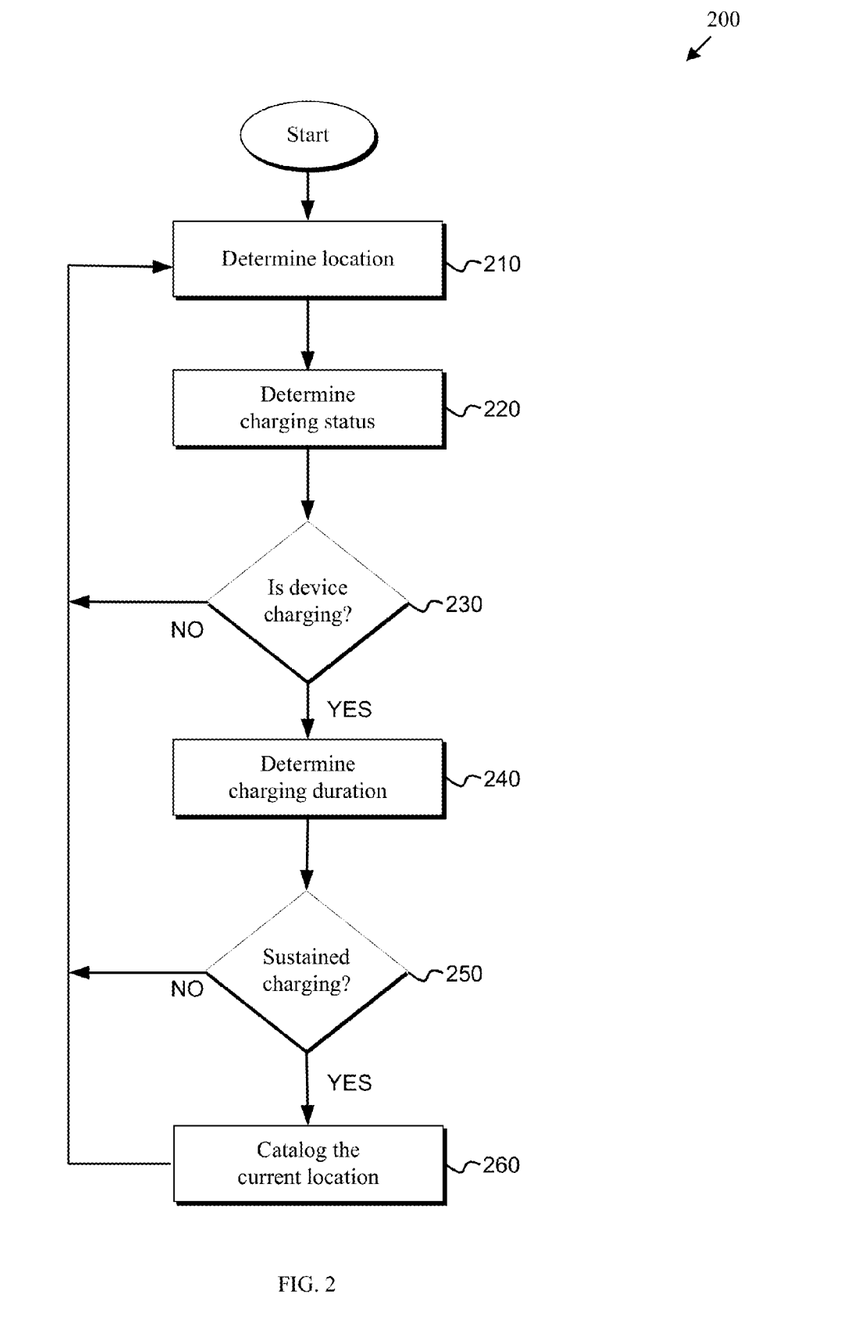
FIG. 2 is a flowchart depicting one embodiment of a charging point detection method.

FIG. 2 is a flowchart depicting one embodiment of a charging point detection method 200. As depicted, the charging point detection method 200 includes determining (210) a current location, determining (220) the charging status, determining (230) whether a device is charging, determining (240) the charging duration, determining (250) whether there has been sustained charging, and cataloging (260) the current location. The charging point detection method 200 enables a mobile device to track the location of the mobile device and document charging points.

Determining (210) a current location may include identifying a geographic location of a mobile device. In one embodiment, the geographic location is determined using Global Positioning System (GPS) functionality and receiving signals and data from satellites to determine the current location. In another embodiment, the current location of the mobile device is determined using Wi-Fi signal strengths. Alternatively, the location of the mobile device may also be determined using cell phone towers. Those of skill in the art will appreciate that there are numerous options available for determining the current location of a mobile device. Each method of determining a location may produce some identifying string or code to represent the current location, and that string or code may be used as a location identifier for the mobile device.

The mobile device may be located within a mode of transportation. Examples include an automobile, train, bus, motorcycle, recreational vehicle, or the like. The mobile device may reference the form of transportation as a current location, as opposed to referencing a physical geographic location (e.g., GPS coordinates). In one embodiment, the mobile device may associate with an automobile through a Bluetooth connection, and use the Bluetooth address corresponding to the automobile as a location identifier. In another embodiment, the mobile device associates with a Radio-frequency identification (RFID) tag attached to a recreational vehicle and uses the RFID as a location identifier.

Determining (220) the charging status may include verifying if a battery charger, recharger, or some other device providing similar function is connected to the mobile device, and the level of charge in the battery is increasing. In one embodiment, the mobile device is connected to a charging device that is plugged into an Alternating Current (AC) wall electrical receptacle. In another embodiment, the mobile device is connected to a charging device that is plugged into the Direct Current (DC) electrical system of an automobile. Alternatively, the mobile device may be charging while connected to another electronic device (e.g., a computer) using a connection cable such as a USB cable, or the like. After determining the charging status, information pertaining to location and charging status may be cataloged for future reference (e.g., date, time, location identifier, charging status, or similar information).

Determining (230) whether the device is charging may include verifying that the level of charge in the battery is increasing. If the device is charging, the depicted method 200 proceeds to the determine charging duration operation 240. Otherwise the method iterates to the determine location operation 210.

Determining (240) the charging duration may include verifying if the mobile device has been charging for at least a predetermined duration. Charging duration may be used to determine if sustained charging has been achieved. Sustained charging may be achieved when a mobile device is continuously charging in a location for at least a predetermined duration. In one embodiment, verification of sustained charging includes starting a timer corresponding to when the charging operation begins. Sustained charging is verified if the device is charging for at least a predetermined duration according to the corresponding timer.

In another embodiment, verification of sustained charging includes testing and documenting the charging status of the mobile device every five minutes. Sustained charging is achieved if the device is charging for at least a predetermined number of consecutive tests. Those of skill in the art will appreciate that there are methods, other than the embodiment disclosed herein, for determining charging duration.

Determining (250) whether there has been sustained charging may include verifying the mobile device has been charging for at least a predetermined duration. If sustained charging is detected, the depicted method 200 proceeds to the catalog operation 260. Otherwise the method iterates to the determine location operation 210.

Cataloging (260) the current location may include storing information about the current location which identifies the current location as either a potential charging point or charging point. The method may determine the status of the current location (i.e., potential charging point or charging point). The method may also maintain information on potential charging point and charging point usage. Additional detail of the catalog operation 260 is depicted and described in further detail in FIG. 3.

Figure 3:
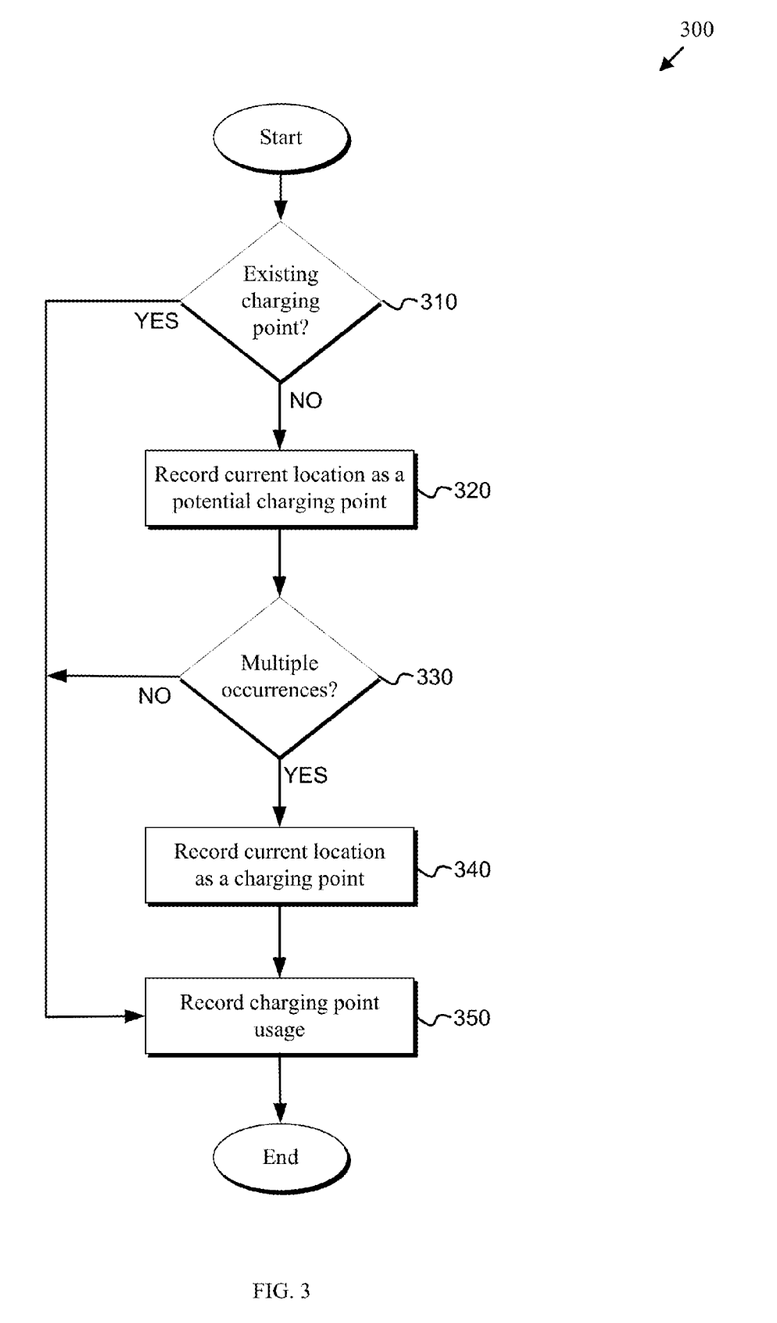
FIG. 3 is a flowchart depicting one embodiment of an operation to catalog charging information corresponding to a current location.

FIG. 3 is a flowchart depicting one embodiment of a catalog charging information method 300. As depicted, the catalog charging information method 300 includes determining (310) whether the current location is an existing charging point, recording (320) a potential charging point, determining (330) whether multiple occurrences exist, recording (340) the current location as a charging point, and recording (350) the charging point usage. The catalog charging information method 300 enables the mobile device to store and maintain potential charging point and charging point usage information so the information may be referenced in the future.

Determining (310) whether the current location is an existing charging point may include verifying if the current location is currently contained in the list of charging points. If the current location is contained in the list of charging points, the depicted method 300 proceeds to the record usage operation 350. Otherwise, the method proceeds to the record a potential charging point operation 320.

Recording (320) a potential charging point may include storing information corresponding to the current location in a list of locations identifying potential charging locations. A potential charging point may be defined as a location where a mobile device has been charged for a sustained duration (i.e., a sustained charge). A charging point, sometimes referred to as a confirmed charging point, may correspond to a location that has been used multiple times (i.e., multiple charges) to charge the mobile device. In one embodiment, the duration corresponding to 'sustained duration' and the required number of charges to qualify as 'multiple charges' are preconfigured in the mobile device. In another embodiment, the duration corresponding to 'sustained duration' and the required number of charges to qualify as 'multiple charges' are configurable by the user of the mobile device.

Determining (330) whether multiple occurrences exist may include verifying if the current location is identified multiple times in a list of potential charging points. If the current location is identified multiple times, the depicted method 300 proceeds to the record charging point operation 340. Otherwise, the method proceeds to the record usage operation 350.

Recording (340) the current location as a charging point may include storing information corresponding to the current location in a list of locations identifying (confirmed) charging points. In one embodiment, the list is maintained as a table in a database. In another embodiment, the list is a simple ordered text list. Those of skill in the art will realize there are numerous options for recording information corresponding to the current location. Additionally, this operation may also include removing entries corresponding to the current location from a potential charging point list.

Recording (350) the charging point usage may include maintaining usage information corresponding to the current location. Usage information may be used to monitor usage duration, frequency, and the like. In one embodiment, usage information is recorded in a usage list containing information corresponding to both potential charging points and (confirmed) charging points. In another embodiment, usage information is maintained by updating the existing record, corresponding to the current location, in either the potential charging point list or the charging point list.

Figure 4:
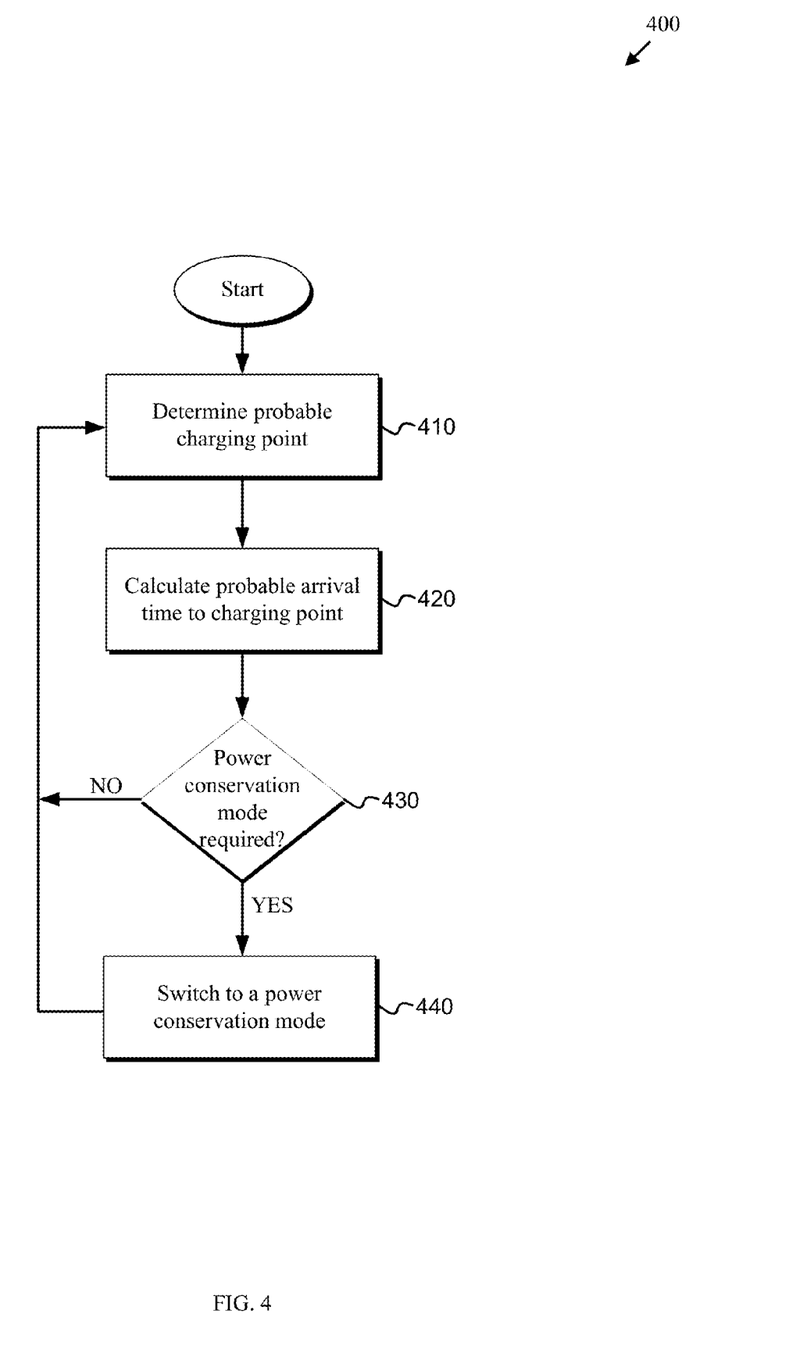
FIG. 4 is a flowchart depicting one embodiment of a battery life conservation method.

FIG. 4 is a flowchart depicting one embodiment of a battery life conservation method 400. As depicted, the battery life conservation method 400 includes determining (410) a probable charging point, calculating (420) an arrival time, determining (430) whether a power conservation mode is required, and switching (440) to a power conservation mode. The battery life conservation method 400 is an iterative operation that enables a mobile device to identify a probable charging point and calculate a probable arrival time at that location. Based on an arrival time, the mobile device may switch to a power conservation mode, if necessary, to avoid running out of battery power.

Determining (410) a probable charging point may include gathering information useful to the mobile device in determining the current location of the mobile device and probable future actions. The gathered information may include current location, previous location, date, time, day of the week, direction of travel (if moving), length of time at current location (if stationary), and the like. The mobile device may also reference the list of (confirmed) charging points and prioritize them according to the probability or likelihood that they may be visited. Prioritization of the charging points may be based on statistics such as, but not limited to, frequency of use, time of day used, time since last use, distance to charging point, currently moving status, and current direction of travel (if moving).

Calculating (420) an arrival time may include calculating the estimated time required to reach a charging point. The calculation may include additional analysis of the information gathered in the determine probable charging point operation 410. Gathered information may include current location, and expected mode of transportation (e.g., public transportation, walking, automobile, and the like). If the current operating environment is moving, the current direction of travel and rate of travel may also be collected. The operation may produce a result in the form of an expected duration or elapsed time until the device arrives at a charging point. Alternatively, the operation may produce a result that is an actual time of arrival. The time may be expressed in local time, Coordinated Universal Time (UTC) or some other time notation format.

Determining (430) whether a power conservation mode is required may include identifying the current power mode in use, and verifying if the remaining charge in the battery is adequate to power the mobile device until the probable charging point is reached. If the battery does not contain adequate charge and a power conservation mode is required, the depicted method 400 proceeds to the switch mode operation 440. Otherwise the method iterates to the determine charging point operation 410.

Switching (440) to a power conservation mode may include enabling a mobile device to continue operating, but with limited or reduced functionality. There may be more than one conservation mode available on a mobile device, and the mode selected may be chosen based on the level of battery conservation required. In one embodiment, at 7 pm on a Wednesday, a mobile device has a remaining battery life of 2 hours under the current power consumption mode. The mobile device determines the location to be a restaurant which is not a charging point. The mobile device has also determined, based on prior use information, the mobile device will likely be at the home of the user, which is a charging point, by 9:30 PM. In an attempt to preserve battery life and remain useful until the probable charging point is reached, the device may switch to a power conservation mode. The power conservation mode may enable the mobile device to remain usable, with reduced functionality, until the probable arrival time at the charging point.

Figure 5:
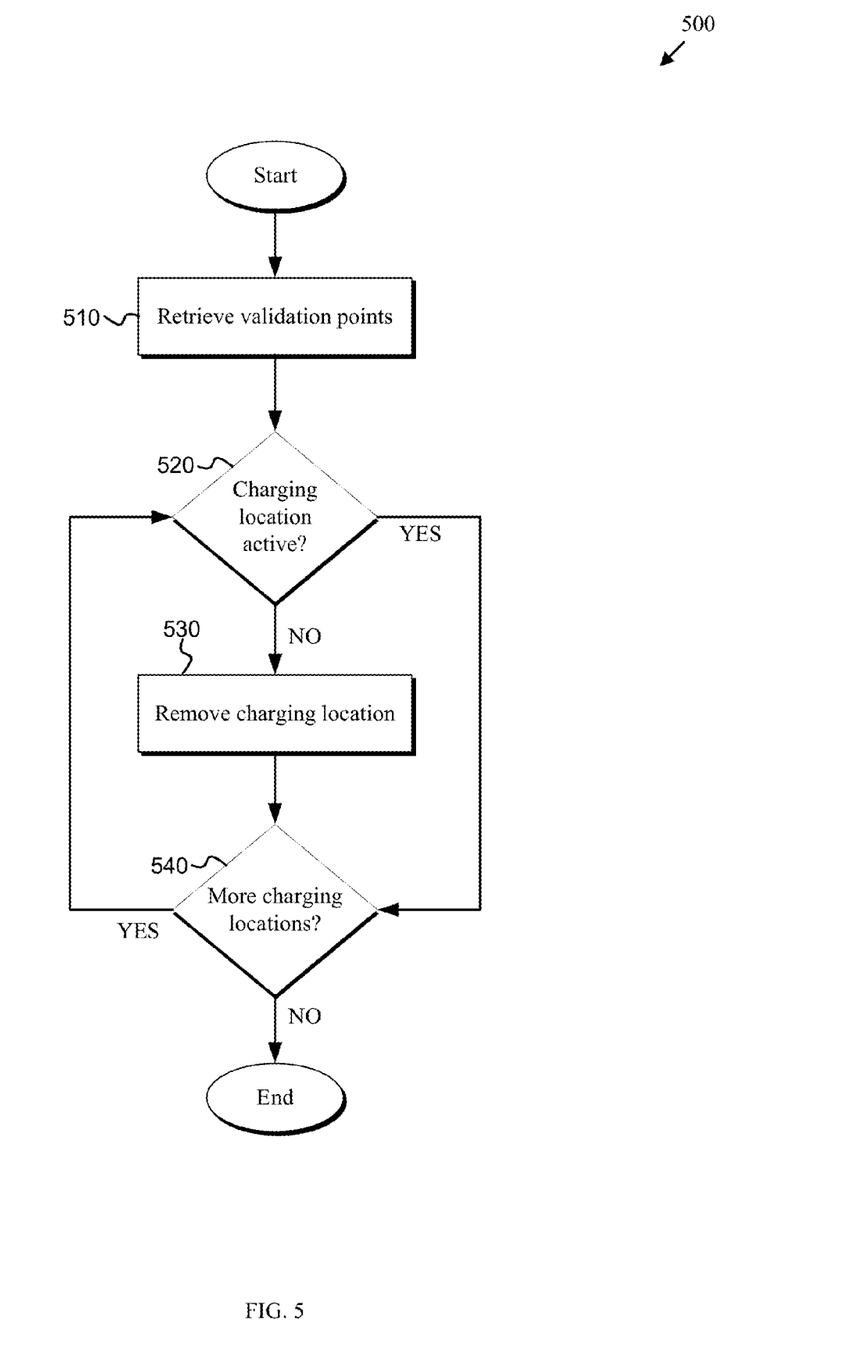
FIG. 5 is a flowchart depicting one embodiment of an inactive charging point removal method.

FIG. 5 is a flowchart depicting one embodiment of an inactive charging point removal method 500. As depicted, the inactive charging point removal method 500 includes retrieving (510) validation points, determining (520) whether a charging location is active, removing (530) a charging location, and determining (540) whether there are more charging locations to validate. The inactive charging point removal method 500 enables a mobile device to maintain a list of charging points that have been recently used, and facilitates removal of charging points that have not been accessed within a predetermined duration. The method 500 may be invoked manually as required, or according to a predetermined schedule.

Retrieving (510) validation points may include obtaining a list of locations to be validated. The list of locations may include the contents of both the list of potential charging points and the list of (confirmed) charging points that may have been created or updated during the catalog charging information operation 300. Additionally any list containing references to potential charging points or (confirmed) charging points may become input to this operation. Those of skill in the art will appreciate that contents of a particular list may be processed individually, or multiple lists may be combined and processed as a single unit.

Determining (520) whether a charging location (i.e., potential charging point or charging point) is active may include verifying that the most recent usage corresponding to the current charging location occurred within a predefined duration. If the current charging location has been used during the specified duration, the depicted method 500 proceeds to the determine whether there are more charging locations operation 540. Otherwise, the method proceeds to the remove charging location operation 530.

Removing (530) a charging location may include receiving information identifying a charging location as inactive. The information identifying the inactive charging location may include a location identifier, an actual index into a database table containing a reference to a location, a generated hash name corresponding to a charging location, or the like. The identifying information may be used to remove all references to the current inactive charging location. An inactive charging location may be located and removed from any list containing references corresponding to potential charging points or (confirmed) charging points.

Determining (540) whether there are more charging locations to validate may include verifying if there are more charging locations to check for recent activity. If charging locations remain to be checked, the depicted method 500 iterates to the determine if a charging location is active operation 520. Otherwise, the method terminates.

Figure 6:
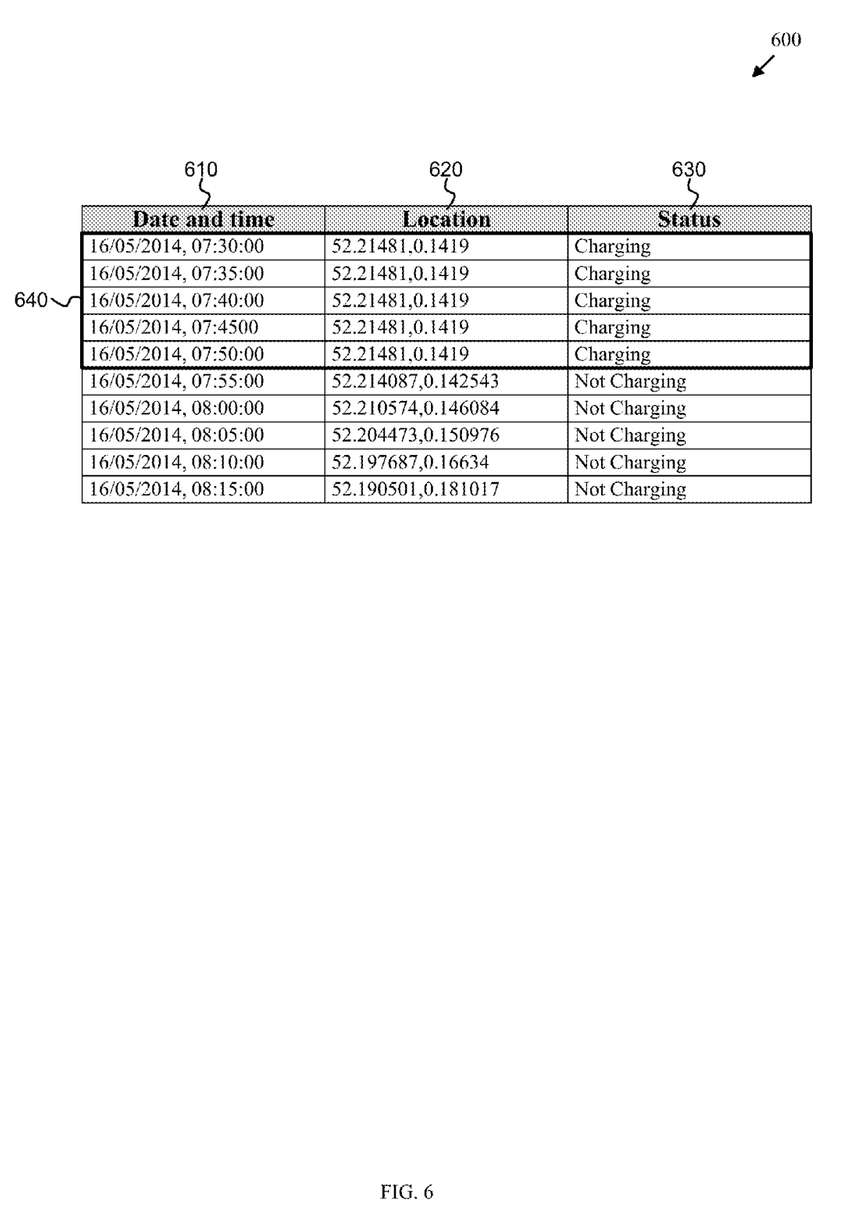
FIG. 6 is a text diagram depicting one embodiment of monitoring information.

FIG. 6 is a text diagram depicting one embodiment of monitoring information 600. As depicted, the monitoring information 600 includes a date and time 610, a location 620, and a status 630. Together, the information provides travel and charging history corresponding to a mobile device.

In the depicted diagram, the date and time 610 may provide a unique identifier or key for referencing information identifying a location and charging status. Tracking the time may provide details indicating a charging pattern, allowing the mobile device to learn when and where a user habitually charges the mobile device. The date and time 610 may also be used to determine how recently a location has been used as a charging point, and in turn may be useful when performing maintenance and removing an inactive charging location.

In the depicted embodiment, the location 620 and status 630 are gathered and recorded every 5 minutes. The location 620 lists GPS coordinates documenting the geographic location corresponding to the mobile device at a specific time. The status 630 records the charging status of either charging or not charging. As depicted in the diagram, a grouping of entries 640 from a single location (i.e., 52.21481,0.1419) has a status of charging. The grouping may be used by methods disclosed herein to designate the location corresponding to the grouping of entries 640 as a potential charging point. If the particular location appears in multiple groupings sometimes called charging sessions, the location may be designated as a (confirmed) charging point.

FIG. 7 is a block diagram depicting one example of a computing apparatus (i.e., computer) suitable for executing the methods disclosed herein. The computer 700 may be one embodiment of the server 120 depicted in FIG. 1. It should be appreciated that FIG. 7 provides only an illustration of one implementation and does not imply any limitations with regard to the environments in which different embodiments may be implemented. Many modifications to the depicted environment may be made.

As depicted, the computer 700 includes communications fabric 702, which provides communications between computer processor(s) 705, memory 706, persistent storage 708, communications unit 712, and input/output (I/O) interface(s) 715. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer readable storage media. In this embodiment, memory 706 includes random access memory (RAM) 716 and cache memory 718. In general, memory 706 can include any suitable volatile or non-volatile computer readable storage media.

One or more programs may be stored in persistent storage 708 for execution by one or more of the respective computer processors 705 via one or more memories of memory 706. The persistent storage 708 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links.

I/O interface(s) 715 allows for input and output of data with other devices that may be connected to computer 700. For example, I/O interface 715 may provide a connection to external devices 720 such as a keyboard, keypad, a touch screen, and/or some other suitable input device. External devices 720 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 708 via I/O interface(s) 715. I/O interface(s) 715 also connect to a display 722. Display 722 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:

1. A method, executed by a computer, for detecting mobile device charging points, the method comprising:
    determining a charging status of the mobile device, wherein the mobile device determines the mobile device is charging upon satisfaction of predetermined conditions including a first condition wherein a charger is connected to a battery of the mobile device, a second condition wherein a level of charge for the battery of the mobile device is increasing, and a third condition wherein the charger is connected to the battery of the mobile device for at least a predetermined length of time, and wherein the mobile device determines the mobile device is not charging upon non-satisfaction of the predetermined conditions;
    determining a current location of the mobile device by a global positioning system of the mobile device;
    cataloging the current location as a confirmed charging point responsive to the mobile device determining the mobile device is charging at the current location and that the mobile device has charged for at least the predetermined length of time at the current location for at least a predetermined number of times, to provide a list of confirmed charging points;
    determining by the mobile device an amount of charge remaining for the battery of the mobile device;
    referencing the list of confirmed charging points, wherein the referencing of the list of confirmed charging points is performed responsive to the mobile device determining the mobile device is not charging;
    identifying a confirmed charging point that is most likely to be visited by the mobile device, responsive to the mobile device determining the mobile device is not charging, wherein identifying the confirmed charging point that is most likely to be visited includes prioritizing the list of confirmed charging points based on a frequency of use by the mobile device, a time of day used by the mobile device, a time since last use by the mobile device, a distance to the confirmed charging point that is most likely to be visited, a current mobility status of the mobile device, and a current direction of travel of the mobile device;
    determining a probable travel time of the mobile device to the confirmed charging point that is most likely to be visited responsive to the mobile device determining the mobile device is not charging, wherein determining the probable travel time of the mobile device to the confirmed charging point that is most likely to be visited includes determining a direction of travel of the mobile device, a rate of travel of the mobile device and an expected mode of transportation of the mobile device, the expected mode of transportation including walking, bicycle, public transportation and automobile; and activating by the mobile device a power conservation mode for the mobile device responsive to the mobile device determining the mobile device is not charging and the amount of charge required for the probable travel time is greater than the amount of charge determined by the mobile device to be remaining for the battery of the mobile device.

2. The method of claim 1, wherein the current location is stationary.

3. The method of claim 1, wherein the current location is designated as a potential charging point.

4. The method of claim 3, wherein the potential charging point is designated as a charging point in response to multiple charging sessions at the potential charging point.

5. The method of claim 1, further comprising determining a confirmed charging point that is unused over a selected duration and removing the confirmed charging point from the list of confirmed charging points.

6. The method of claim 1, further comprising determining a likelihood the mobile device will visit the charging point.

7. The method of claim 1, further comprising determining if a current operating environment is moving.

8. The method of claim 7, wherein the operating environment that is moving is designated as a charging point.

* * * * *